US006674206B2

(12) United States Patent
Maguire et al.

(10) Patent No.: US 6,674,206 B2
(45) Date of Patent: Jan. 6, 2004

(54) TANGENTIAL TORQUE SUPPORT

(75) Inventors: James F. Maguire, Andover, MA (US);
Peter M. Winn, Shrewsbury, MA (US)

(73) Assignee: American Superconductor Corporation, Westborough, MA (US)

(*) Notice: Subject to any disclaimer, the term of this patent is extended or adjusted under 35 U.S.C. 154(b) by 0 days.

(21) Appl. No.: 10/083,025

(22) Filed: Feb. 26, 2002

(65) Prior Publication Data
US 2002/0145355 A1 Oct. 10, 2002

(51) Int. Cl.[7] ................................................. H02K 3/00
(52) U.S. Cl. ......................... 310/179; 310/52; 310/261
(58) Field of Search ..................... 310/179, 52, 85, 310/92, 129, 261

(56) References Cited

U.S. PATENT DOCUMENTS

| | | | | |
|---|---|---|---|---|
| 4,237,392 A | * | 12/1980 | Ying et al. | 310/52 |
| 4,267,473 A | * | 5/1981 | Gamble | 310/52 |
| 4,583,014 A | * | 4/1986 | Murphy et al. | 310/52 |
| 5,331,819 A | * | 7/1994 | Matsuda et al. | 62/51.1 |
| 5,777,420 A | * | 7/1998 | Gamble et al. | 310/261 |
| 6,129,477 A | * | 10/2000 | Shoykhet | 403/267 |
| 6,489,701 B1 | * | 12/2002 | Gamble et al. | 310/179 |

* cited by examiner

Primary Examiner—Thanh Lam
(74) Attorney, Agent, or Firm—Fish & Richardson P.C.

(57) ABSTRACT

A superconducting rotor assembly includes an axial shaft and a winding support structure. A torque tube is connected to this winding support structure. An interconnection assembly mechanically couples the torque tube to the axial shaft. This interconnection assembly is configured to convert a torsional torque load experienced by the torque tube to a tangential torque load which is provided to the axial shaft.

18 Claims, 5 Drawing Sheets

TANGENTIAL TORQUE SUPPORT

RELATED APPLICATIONS

The following applications are hereby incorporated by referenced into the subject application as if set forth herein in full: (1) U.S. application Ser. No. 09/632,599, filed Aug. 4, 2000, entitled "Superconducting Synchronous Machine Field Winding Protection"; (2) U.S. application Ser. No. 09/632,602, filed Aug. 4, 2000, entitled "Segmented Rotor Assembly For Superconducting Rotating Machines"; (3) U.S. application Ser. No. 09/632,600, filed Aug. 4, 2000, entitled "Exciter For Superconducting Rotating Machinery"; (4)U.S. application Ser. No. 09/632,601, filed Aug. 4, 2000, entitled "Stator Support Assembly For Superconducting Rotating Machines"; (5) U.S. application Ser. No. 09/480,430, filed Jan. 11, 2000, entitled "Exciter and Electronic Regulator for Rotating Machinery"; (6) U.S. application Ser. No. 09/481,480, filed Jan. 11, 2000, entitled "Internal Support for Superconducting Wires"; (7) U.S. Ser. No. 09/480,396, filed Jan. 11, 2000, entitled "Cooling System for HTS Machines"; (8) U.S. application Ser. No. 09/415,626, filed Oct. 12, 1999, entitled "Superconducting Rotating Machine"; (9) U.S. Application Ser. No. 60/266,319, filed Jan. 11, 2000, entitled "HTS Superconducting Rotating Machine"; (10) U.S. application Ser. No. 09/905,611, filed Jul. 13, 2001, entitled "Enhancement of Stator Leakage Inductance in AirCore Machines"; (11) U.S. application Ser. No. 09/909,412, filed Jul. 19, 2001, entitled "Torque Transmission Assembly for use in Superconducting Rotating Machines"; and (12) U.S. application Ser. No. 09/956,328, filed Sep. 19, 2001, entitled "Axially-Expandable EM Shield".

TECHNICAL FIELD

This invention relates to rotating machines.

BACKGROUND

Superconducting air-core, synchronous electric machines have been under development since the early 1960's. The use of superconducting windings in these machines has resulted in a significant increase in the field electromotive forces generated by the windings and increased flux and power densities of the machines.

Early superconducting machines included field windings wound with low temperature superconductor (LTS) materials, such as NbZr or NbTi and later with $Nb_3Sn$. The field windings were cooled with liquid helium from a stationary liquifier. The liquid helium was transferred into the rotor of the machine and then vaporized to use both the latent and sensible heat of the fluid to cool the windings. This approach proved to be viable for only very large synchronous machines. With the advent of high temperature superconductor (HTS) materials in the 1980's, the cooling requirements of these machines were greatly reduced and smaller superconducting machines were realizable.

While HTS materials reduce the cooling requirements of superconducting machines, it is still important that the field windings of these machines remain sufficiently cool so that they maintain their superconducting characteristics and properties. Accordingly, these machines utilize various assemblies that thermally insulate these cool field windings from the warm output shaft of the machine.

SUMMARY

According to an aspect of this invention, a superconducting rotor assembly includes an axial shaft. A torque tube is connected to a winding support structure. An interconnection assembly mechanically couples the torque tube to the axial shaft. This interconnection assembly is configured to convert a torsional torque load experienced by the torque tube to a tangential torque load which is provided to the axial shaft.

Embodiments of this aspect of the invention may also include the following. The interconnection assembly is configured to receive a tangential torque load which is a compression load or a tension load. The thermally-insulating interconnection assembly includes a torque tube flange for connecting the interconnection assembly to the torque tube. An axial flange connects the interconnection assembly to the axial shaft and at least one thermally-insulating tangential load-bearing member connects the torque tube flange to the axial flange. The axial flange may also be a collar. Further, the axial flange may be directly connected to one of the end plates connected to the axial shaft of the rotor assembly.

The torque tube flange includes at least one protruding bracket assembly positioned radially about the torque tube flange. The protruding bracket assemblies are configured to connect the torque tube flange to the thermally-insulating tangential load-bearing members.

The axial flange includes at least one protruding bracket assembly positioned radially about the axial flange. The protruding bracket assemblies are configured to connect the axial flange to the thermally-insulating tangential load-bearing members.

The thermally-insulating tangential load bearing members are constructed of a high-strength, low thermal conductivity composite material, such as a G-10 phenolic material. The torque tube is constructed of a high-strength, low thermal conductivity metallic material, such as Inconel.

A superconducting winding assembly is mounted on the winding support structure. The superconducting winding assemblies are constructed using a high-temperature superconducting material. The high temperature superconducting material is chosen from the group consisting of: thallium-barium-calcium-copper-oxide; bismuth-strontium-calcium-copper-oxide; mercury-barium-calcium-copper-oxide; and yttrium-barium-copper-oxide. The superconducting rotor assembly further includes a refrigeration system for cooling the superconducting winding assembly.

According to a further aspect of this invention, an interconnection assembly for converting a torsional torque load experienced by a torque tube to a tangential torque load which is provided to an axial shaft includes a torque tube flange for connecting the interconnection assembly to the torque tube. An axial flange connects the interconnection assembly to the axial shaft. At least one thermally-insulating tangential load-bearing member connects the torque tube flange and the axial flange.

Embodiments of this aspect of the invention may also include the following. The interconnection assembly is configured to receive a tangential torque load which is a compression load or a tension load. The axial flange may be a collar or may be directly connected to one of the end plates connected to the axial shaft of the rotor assembly.

The torque tube flange includes at least one protruding bracket assembly positioned radially about the torque tube flange. The protruding bracket assemblies are configured to connect the torque tube flange to the thermally-insulating tangential load-bearing members.

The axial flange includes at least one protruding bracket assembly positioned radially about the axial flange. The protruding bracket assemblies are configured to connect the axial flange to the thermally-insulating tangential load-bearing members. The thermally-insulating tangential load bearing members are constructed of a high-strength low thermal conductivity composite material, such as a G-10 phenolic material. The torque tube is constructed of a high-strength, low thermal conductivity metallic material, such as Inconel.

According to a further aspect of this invention, a superconducting rotor assembly includes an axial shaft and a winding support structure. An asynchronous field filtering shield surrounds the winding support structure. The asynchronous field filtering shield is connected to the axial shaft via one or more end plates positioned on distal ends of the shield. An interconnection assembly connects the winding support structure to the asynchronous field filtering shield. The interconnection assembly is configured to convert a torsional torque load experienced by the winding support structure to a tangential torque load which is provided to the asynchronous field filtering shield.

Embodiments of this aspect of the invention may also include the following. The interconnection assembly is configured to receive a tangential torque load which is a compression load or a tension load. The thermally-insulating interconnection assembly includes one or more discrete torque transfer assemblies. Each discrete torque transfer assembly includes at least one support structure bracket assembly rigidly attached to the winding support structure, and at least one shield bracket assembly rigidly attached to the asynchronous field filtering shield and positioned proximate the at least one support structure bracket assembly. At least one thermally-insulating tangential load-bearing member, which is positioned between the at least one support structure bracket assembly and the at least one shield bracket assembly, connects the at least one support structure bracket assembly and the at least one shield bracket assembly. The at least one thermally-insulating tangential load bearing member is constructed of a high-strength low thermal conductivity composite material, such as a G-10 phenolic material. The at least one shield bracket assembly and the at least one support structure bracket assembly are constructed of a high-strength, low thermal conductivity metallic material, such as Inconel. A superconducting winding assembly is mounted on the winding support structure. The superconducting winding assembly is constructed using a high-temperature superconducting material. The superconducting rotor assembly includes a refrigeration system for cooling the superconducting winding assembly.

According to a further aspect of this invention, an interconnection assembly for converting a torsional torque load experienced by a winding support structure to a tangential torque load which is provided to an asynchronous field filtering shield includes one or more discrete torque transfer assemblies. Each discrete torque transfer assembly includes at least one support structure bracket assembly rigidly attached to the winding support structure, and at least one shield bracket assembly rigidly attached to the asynchronous field filtering shield and positioned proximate the at least one support structure bracket assembly. At least one thermally-insulating tangential load-bearing member, which is positioned between the at least one support structure bracket assembly and the at least one shield bracket assembly, connects the at least one support structure bracket assembly and the at least one shield bracket assembly.

Embodiments of this aspect of the invention may also include the following. The interconnection assembly is configured to receive a tangential torque load which is a compression load or a tension load. The at least one thermally-insulating tangential load bearing member is constructed of a high-strength low thermal conductivity composite material, such as a G-10 phenolic material. The at least one shield bracket assembly and the at least one support structure bracket assembly are constructed of a high-strength, low thermal conductivity metallic material, such as Inconel.

According to a further aspect of this invention, a superconducting rotor assembly includes an axial shaft and a winding support structure. At least one end plate is rigidly attached to the axial shaft at a distal end of the winding support structure. An interconnection assembly connects the winding support structure to the at least one end plate. The interconnection assembly is configured to convert a torsional torque load experienced by the winding support structure to a tangential torque load which is provided to the at least one end plate.

Embodiments of this aspect of the invention may also include the following. The interconnection assembly is configured to receive a tangential torque load which is a compression load or a tension load. The thermally-insulating interconnection assembly includes one or more discrete torque transfer assemblies. Each discrete torque transfer assembly includes at least one support structure bracket assembly rigidly attached to the winding support structure, and at least one end plate bracket assembly rigidly attached to the at least one end plate and positioned proximate the at least one support structure bracket assembly. At least one thermally-insulating tangential load-bearing member, which is positioned between the at least one support structure bracket assembly and the at least one end plate bracket assembly, connects the at least one support structure bracket assembly and the at least one end plate bracket assembly. The at least one thermally-insulating tangential load bearing member is constructed of a high-strength low thermal conductivity composite material, such as a G-10 phenolic material. The at least one end plate bracket assembly and the at least one support structure bracket assembly are constructed of a high-strength, low thermal conductivity metallic material, such as Inconel. A superconducting winding assembly is mounted on the winding support structure. The superconducting winding assembly is constructed using a high-temperature superconducting material. The superconducting rotor assembly includes a refrigeration system for cooling the superconducting winding assembly.

According to a further aspect of this invention, an interconnection assembly for converting a torsional torque load experienced by a winding support structure to a tangential torque load which is provided to at least one end plate includes one or more discrete torque transfer assemblies. Each discrete torque transfer assembly includes at least one support structure bracket assembly rigidly attached to the winding support structure, and at least one end plate bracket assembly rigidly attached to the at least one end plate and positioned proximate the at least one support structure bracket assembly. At least one thermally-insulating tangential load-bearing member, which is positioned between the at least one support structure bracket assembly and the at least one end plate bracket assembly, connects the at least one support structure bracket assembly and the at least one end plate bracket assembly.

Embodiments of this aspect of the invention may also include the following. The interconnection assembly is configured to receive a tangential torque load which is a compression load or a tension load. The at least one thermally-insulating tangential load bearing member is constructed of a high-strength low thermal conductivity composite material, such as a G-10 phenolic material. The at least one end plate bracket assembly and the at least one support structure bracket assembly are constructed of a high-strength, low thermal conductivity metallic material, such as Inconel.

One or more advantages can be provided from the above aspects of the invention. The cool rotor winding can be thermally insulated from the warm output shaft of the rotating machine. This can be accomplished while providing a high-strength connection between the rotor windings and the output shaft. The strength of the torque tube can be increased by constructing it from a high-strength, moderately thermally insulating material. By constructing the tangential load bearing members from a moderately strong, highly thermally insulating material, the cool rotor windings can be thermally isolated from the warm output shaft. Additionally, by positioning the tangential load bearing members so that they are only exposed to compressive loading, any strength-related shortcomings associated with the moderately strong, highly thermally insulating material can be minimized.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
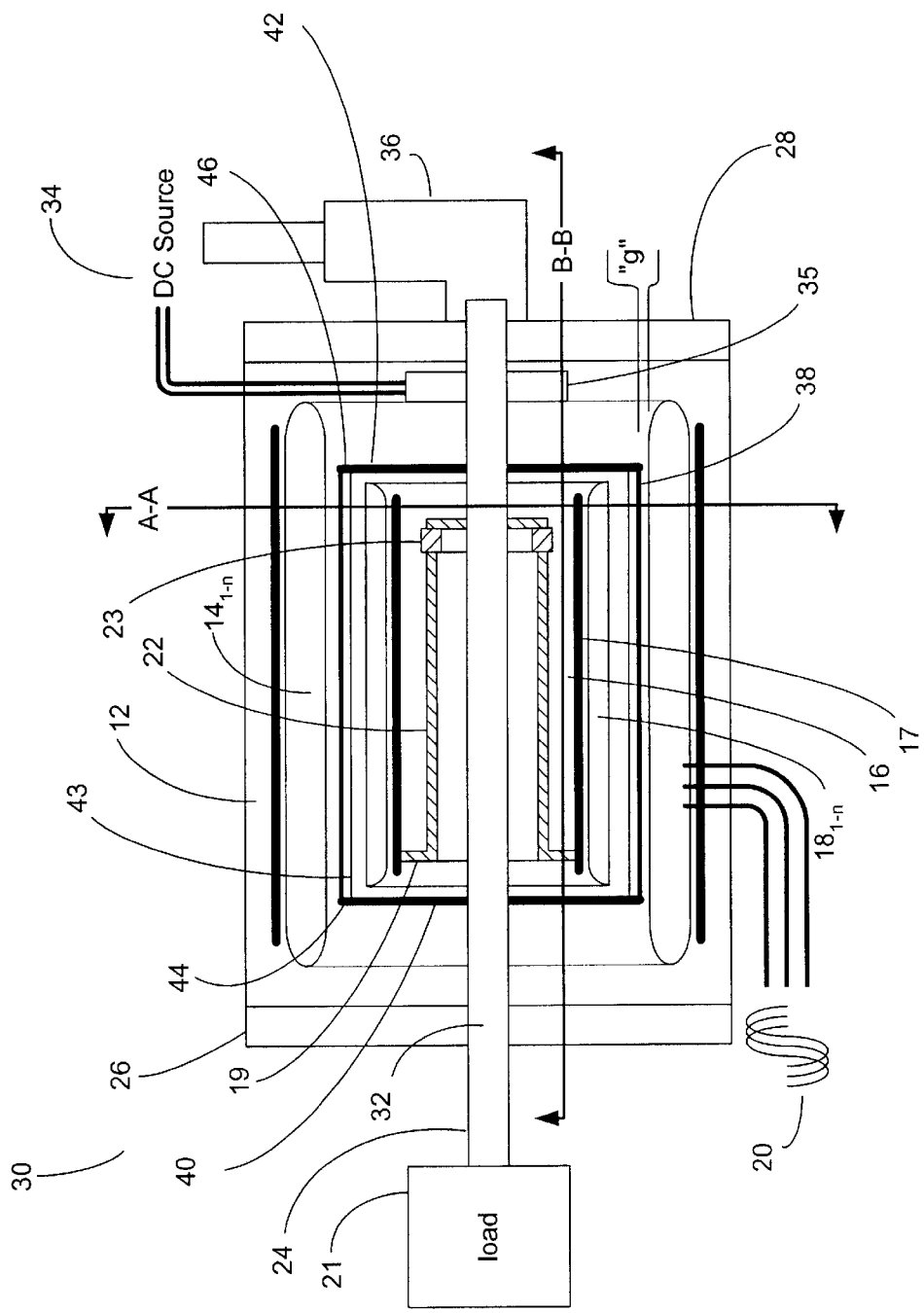
FIG. 1 is a cross-sectional side view of a superconducting rotating machine.

Referring to FIG. 1, a superconducting rotating machine 10 has a stator assembly 12 including stator coil assemblies $14_{1-n}$. As is well known in the art, the specific number of stator coil assemblies $14_{1-n}$ included within stator assembly 12 varies depending on various design criteria, such as whether the machine is a single phase or a polyphase machine. For example, in one 33,000 horsepower superconducting machine design, stator assembly 12 includes one hundred and eighty stator coil assemblies $14_{1-n}$.

A rotor assembly 16 rotates within stator assembly 12. As with stator assembly 12, rotor assembly 16 includes rotor winding assemblies $18_{1-n}$. In the same 33,000 horsepower superconducting machine design, rotor assembly 16 includes twelve rotor winding assemblies $18_{1-n}$. These rotor winding assemblies, during operation, generate a magnetic flux that links rotor assembly 16 and stator assembly 12.

During operation of superconducting rotating machine 10, a voltage source (not shown, i.e., a generator, a utility line, etc.) provides a supply voltage 20 to stator coil assemblies $14_{1-n}$. By applying this supply voltage 20, machine 10 is brought up to its operating speed, which is proportional to the frequency of supply voltage 20. Accordingly, if the frequency of supply voltage 20 is held constant, machine 10 (i.e., rotor assembly 16) will rotate at a constant (or synchronous) speed. The torque generated by this now-rotating rotor assembly 16 is transferred to a load 21 (e.g., a propeller shaft of a ship, a conveyor belt on a production line, the drive wheels of a diesel locomotive, etc.). The rotor winding assemblies $18_{1-n}$ are mounted on a support structure 17 which is connected to a first flange 19 that transfers the motor torque to a torque tube 22. Torque tube 22 is connected to a thermally-insulating interconnection assembly 23, which is connected to an output shaft 24. Thermally-insulating interconnection assembly 23 provides a high-strength, thermally-insulating torque path for transferring the motor torque to load 21. Flange 19 may be incorporated into torque tube 22 or may be a separate assembly.

Output shaft 24 is supported by a pair of bearing plates 26, 28, one at each end of rotor assembly 16. The bearing plate 26 on the drive end 30 of superconducting rotating machine 10 contains a passage 32 through which output shaft 24 passes. Additionally, bearing plate 28 may also have a passage through which the output shaft 24 passes. Bearing plates 26, 28 position rotor assembly 16 at the proper position within stator assembly 12 so that rotor assembly 16 can freely rotate within stator assembly 12 while maintaining the proper gap "g" between rotor assembly 16 and stator assembly 12.

During operation of superconducting rotating machine 10, field energy 34 is applied to rotor winding assembly $18_{1-n}$ through a slip ring/rotating disk assembly 35. This field energy 34 is typically in the form of a DC current because rotor winding assemblies $18_{1-n}$ require DC current to generate the magnetic field (and the magnetic flux) needed to link the rotor assembly 16 and stator assembly 12. However, if field energy 34 is supplied in the form of an AC current, a rectifier/thyristor circuit (not shown) is employed to convert the AC current into a DC current.

While stator coil assemblies $14_{1-n}$ are non-superconducting copper coil assemblies, rotor winding assemblies $18_{1-n}$ are superconducting assemblies incorporating either HTS (High Temperature Superconductor) or LTS (Low Temperature Superconductor) windings. Examples of LTS conductors are: niobium-zirconium; niobium-titanium; and niobium-tin. Examples of HTS conductors are: thallium-barium-calcium-copper-oxide; bismuth-strontium-calcium-copper-oxide; mercury-barium-calcium-copper-oxide; yttrium-barium-copper-oxide, or any of the $MgB_2$ Magnesium diboride compounds As these superconducting conductors only achieve their superconducting characteristics when operating at low temperatures (e.g., <100° K.), superconducting machine 10 includes a refrigeration system 36. Refrigeration system 36 is typically in the form of a cryogenic cooler that maintains the operating temperature of rotor winding assemblies $18_{1-n}$ at an operating temperature sufficiently low to enable the conductors to exhibit their superconducting characteristics.

Rotor assembly 16 includes an asynchronous field filtering shield 38 positioned between stator assembly 12 and rotor assembly 16. As rotor assembly 16 is typically cylindrical in shape, asynchronous field filtering shield 38 is also typically cylindrical in shape. Stator assembly 12 is typically powered by multiphase AC power or pulse-width modulated (PWM) power 20 at a frequency commensurate with the desired shaft speed. This, in turn, generates a rotating magnetic field that rotates about the axis of the cylindrically-shaped stator assembly 12. As stated above, the frequency of the multiphase AC power 20 supplied to stator assembly 12 proportionally controls the rotational speed of superconducting machine 10. Since AC or PWM signals naturally contain harmonics of their primary frequency (e.g., odd multiples of a 60 Hertz signal), it is desirable to shield the rotor winding assemblies $18_{1-n}$ of rotor assembly 16 from these asynchronous fields. Accordingly, asynchronous field filtering shield 38, which is fitted to rotor assembly 16, covers (or shields) rotor winding assemblies $18_{1-n}$ from the asynchronous fields generated as a result of these harmonics present in three-phase AC power 20. Asynchronous field filtering shield 38 is constructed of a non-magnetic material (e.g., copper, aluminum, etc.) and should be of a length sufficient to fully cover and shield rotor winding assemblies $18_{1-n}$. In a preferred embodiment, asynchronous field filtering shield 38 is constructed of 6061T6 structural aluminum. The thickness of shield 38 varies inversely with respect to the frequency of the three-phase AC power 20 supplied to stator assembly 12, which is typically in the range of 2–120 Hertz. Typically, the thickness of shield 38 varies from ½–3 inches depending on this supply frequency.

Shield 38 is connected to output shaft 24 via a pair of end plates 40, 42. These end plates 40, 42 are rigidly connected to output shaft 24. This rigid connection can be in the form of a weld or a mechanical fastener system (e.g., bolts, rivets, splines, keyways, etc.).

A vacuum chamber sleeve 43 surrounds the rotor winding assemblies $18_{1-n}$. This vacuum chamber sleeve 43 is positioned between shield 38 and the rotor winding assemblies $18_{1-n}$ and is connected on its distal ends to end plate 40, 42. This connection can be in the form of a weld, a braze, or a mechanical fastener system (e.g., bolts, rivets, splines, keyways, etc.). Typically, vacuum chamber sleeve 43 is relatively thin (e.g., $3/16''$) and is constructed of stainless steel. When vacuum chamber sleeve 43 is connected to the end plates, an air tight chamber is formed which encloses the rotor winding assemblies $18_{1-n}$. This air-tight chamber can then be evacuated, thus forming a vacuum within the chamber. This helps to insulate the rotor winding assemblies $18_{1-n}$ (which are superconducting and kept cool) from output shaft 24 (which is warm).

As stated above, a gap "g" exists between stator assembly 12 and rotor assembly 16. In order to reduce the size of superconducting rotating machine 10, it is desirable to reduce the dimensions of this gap (or spacing) to a minimum allowable value. In the same 33,000 horsepower superconducting machine, this gap "g" has a value of just over one inch. Specifically, due to the maximization of the flux linkage, the efficiency of machine 10 is maximized when gap "g" is minimized. Unfortunately, when gap "g" is minimized, shield 38 gets very close to the windings of stator coil assembly $14_{1-n}$.

During operation of superconducting rotating machine 10, shield 38 will heat up as a result of eddy current heating caused by the presence of the asynchronous fields described above. As metals (especially aluminum) are known to expand when heated, it is important that rotor assembly 16 be capable of accommodating this expansion. This expansion can occur in two dimensions, both axially (i.e., along the direction of the output shaft 24) and radially (i.e., along the direction of the rotor assembly's radius). Accordingly, rotor assembly 16 typically includes a pair of interconnection assemblies 44, 46 for connecting shield 38 to end plates 40, 42. These interconnections assemblies 44, 46 compensate for the thermal expansion of shield 38 by allowing for axial movement between shield 38 and end plates 40, 42 while restricting tangential movement.

As stated above, torque tube 22 in combination with thermally-insulating interconnection assembly 23 transfer the torque generated by superconducting rotating machine 10 to load 21. Accordingly, torque tube 22 must be constructed of a material sufficiently strong enough to withstand the torsional twisting of this torque load. A typical example of such a material is Inconel™ (Inco Alloys International, Inc., 3200 Riverside Drive Huntington, W. Va. 25720), which provides relatively low thermal conductivity in addition to a high level of strength. The relatively low thermal conductivity of Inconel™ resists the transfer of heat from the warm output shaft 24 to the cool rotor winding assemblies $18_{1-n}$.

As stated above, in order for rotor winding assemblies $18_{1-n}$ to achieve their superconducting characteristics, these winding assemblies $18_{1-n}$ must be kept cool. Accordingly, thermally-insulating interconnection assembly 23 must provide a high-level of thermal insulation between the relatively cool torque tube 22 and the warm output shaft 24. Additionally, as stated above, this thermally-insulating interconnection assembly 23 must be sufficiently strong to withstand the torque (and torsional twisting) generated by superconducting rotating machine 10. Unfortunately, metallic materials such as Inconel™ do not provide the required level of thermal insulation. Further, composite materials (e.g., G-10 phenolic, woven-glass epoxy, etc.), while providing a high level of thermal insulation, do not provide the required level of shear strength needed to withstand the torsional twisting and torque generated by superconducting rotating machine 10. Accordingly, thermally-insulating interconnection assembly 23 utilizes a high-strength material (such as Inconel™) at the points where the thermally-insulating interconnection assembly 23 contacts torque tube 22 and output shaft 24 in a shear configuration. Additionally, thermally-insulating interconnection assembly 23 utilizes a high thermally insulating material placed into a tangentially loaded configuration (i.e., either compression or tension) to act as a heat barrier which minimizes the transfer of thermal energy from the warm output shaft 24 to the relatively cool torque tube 22.

Accordingly, thermally-insulating interconnection assembly 23 uses a combination of materials to produce an assembly that is both strong and thermally insulating. Specifically, since the torque tube 22 is subjected to high levels of torsional loading and twisting, this tube 22 is constructed of a high-strength material (such as Inconel™). Additionally, the portions of assembly 23 that are placed in a high-shear configuration due to this torsional loading, such as any flanges that connect assembly 23 to torque tube 22 or output shaft 24, are also constructed of a high-strength material. The thermally-insulating characteristics of interconnection assembly 23 are a result of using a high thermally insulating material (e.g., G-10 phenolic, woven-glass epoxy, etc.) to minimize the transfer of thermal energy from the warm output shaft 24 to the cool torque tube 22. Unfortunately, this high thermally insulating material does not have the level of strength required to handle high torsional loads, such as those experienced by torque tube 22 or the flanges that connect assembly 23 to torque tube 22 and output shaft 24. Therefore, the high thermally insulating material used in assembly 23, which acts as a heat barrier that minimizes the transfer of thermal energy from the warm output shaft 24 to the relatively cool torque tube 22, is positioned in a tangentially-loaded configuration. By positioning this high thermally insulating material in a tangentially loaded configuration, the load it experiences is linear, essentially parallel to the tangential rotation of the torque tube, and perpendicular to the axis of rotation of the torque tube.

Figure 2:
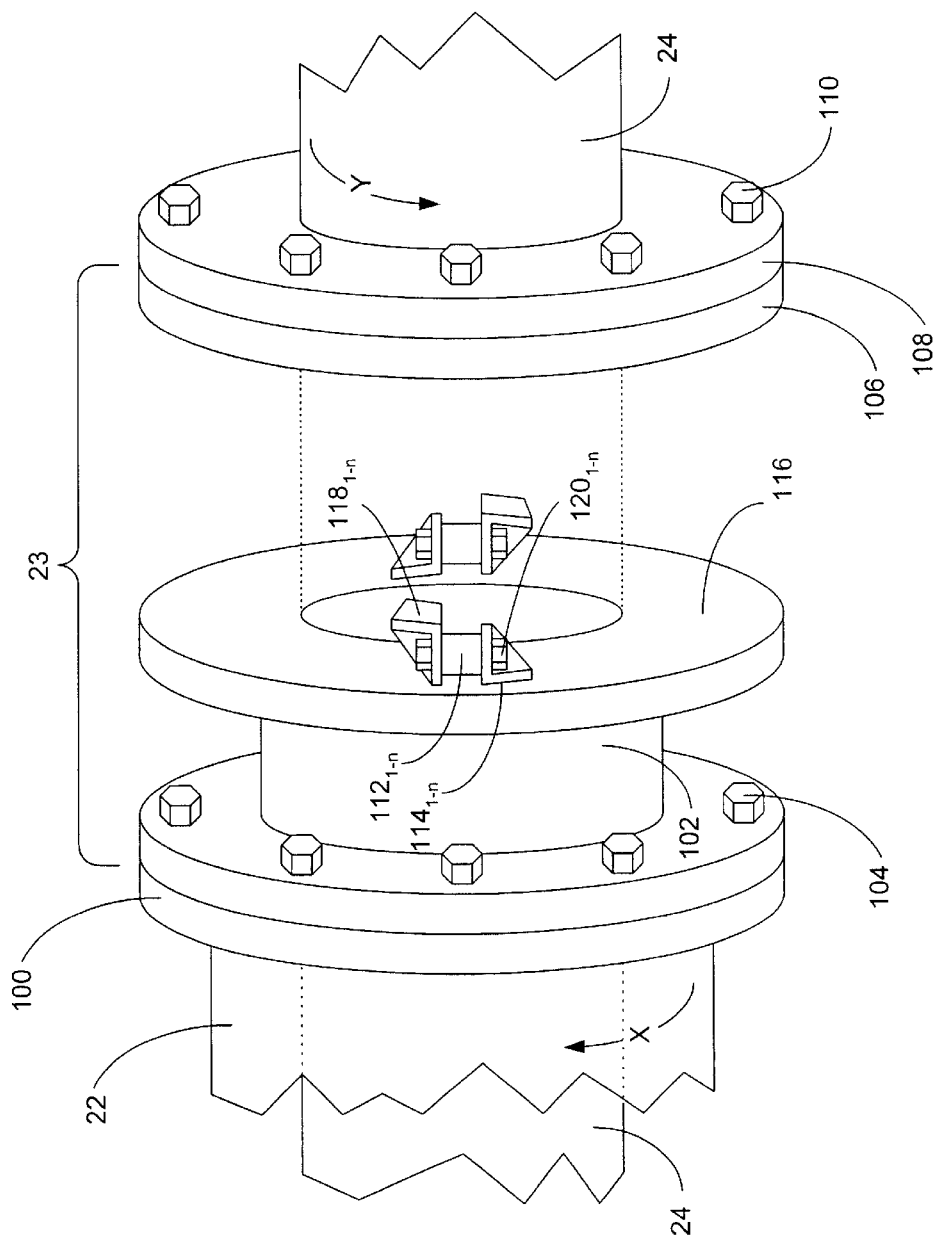
FIG. 2 is an isometric view of an interconnection assembly of the superconducting rotating machine of FIG. 1.

Referring to FIGS. 1 and 2, the details of one embodiment of the thermally-insulating interconnection assembly 23 as shown in FIG. 1 and described above, are shown. Typically, torque tube 22 includes a flange 100 for connecting torque tube 22 to thermally-insulating interconnection assembly 23. Thermally-insulating interconnection assembly 23 includes a torque tube flange 102 configured to mate with flange 100 of torque tube 22. Typically, torque tube flange 102 is constructed of a high strength material such as Inconel™ and these flanges 100 and 102 are bolted together using high strength bolts 104.

Thermally-insulating interconnection assembly 23 includes an axial flange 106 which connects thermally-insulating interconnection assembly 23 to output shaft 24. Typically, axial flange 106 is constructed of a high-strength material such as Inconel™ and this flange 106 is connected to a flange 108 on output shaft 24 using high strength bolts 110. Alternatively, axial flange 106 may be in the form of a collar (not shown) which surrounds output shaft 24 and is connected to shaft 24 via some form of rigid connection. This rigid connection can be in the form of a weld or a mechanical fastener system (e.g., bolts, rivets, splines, keyways, etc.). This configuration would eliminate the need for a flange 108 on output shaft 24.

Figure 2A:
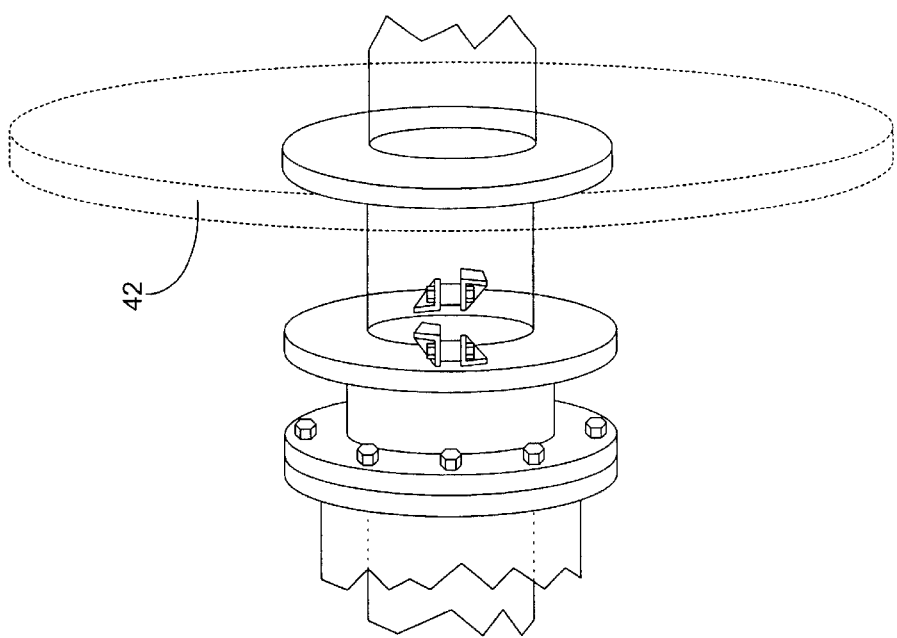
FIG. 2a is an isometric view of an alternative embodiment of the interconnection assembly of FIG. 2.

Referring to FIGS. 1, 2 and 2a, axial flange 106 need not be directly connected to output shaft 24. For example, since superconducting rotating machine 10 includes a pair of end plates 40, 42, and each of these end plates is rigidly attached to output shaft 24, axial flange 106 can be connected to one of these end plates. This rigid connection can be in the form of a weld or a mechanical fastener system (e.g., bolts, rivets, etc.). This configuration (as shown in FIG. 2a) would eliminate the need for a flange 108 on output shaft 24, as the end plate would function as the flange and the motor torque would be transferred to output shaft 24 through the end plate.

Referring again to FIGS. 1 and 2, thermally-insulating interconnection assembly 23 includes thermally-insulating tangential load bearing members $112_{1-n}$ for connecting torque tube flange 102 and axial flange 106. As stated above, composite materials, such as G-10 phenolic or woven-glass epoxy, have poor shear strength capabilities, thus making them a poor choice for flanges 102 and 106, as they are in a shear configuration. However, these composite material have acceptable tangential loading capabilities. Specifically, these materials have moderate tension capabilities and good compression capabilities.

Please note that while this illustration shows two of these thermally-insulating tangential load bearing members $112_{1-n}$, this is for illustrative purposes only and is not intended to be a limitation of the invention. Specifically, the number of thermally-insulating tangential load bearing members $112_{1-n}$ utilized could be varied according to the torque load expected to be transferred through thermally-insulating interconnection assembly 23. In the same 33,000 horsepower superconducting machine design, thermally-insulating interconnection assembly 23 would include four thermally-insulating tangential load bearing members $112_{1-n}$.

Torque tube flange 102 includes one protruding bracket assembly $114_{1-n}$ for each thermally-insulating tangential load bearing member $112_{1-n}$ utilized. These protruding bracket assemblies $114_{1-n}$ are attached to the face 116 of torque tube flange 102. These brackets $114_{1-n}$ may be welded or bolted to torque tube flange 102 and tend to be positioned radially about flange 102.

Axial flange 106 also includes one protruding bracket assembly $118_{1-n}$ for each thermally-insulating tangential load bearing member $112_{1-n}$ utilized. As above, these protruding bracket assemblies $118_{1-n}$ are positioned radially about flange 106, are attached to the face (not shown) of axial flange 106, and are welded or bolted to axial flange 106. Please note that bracket assemblies $118_{1-n}$ are shown being detached from axial flange 106 to ease and unclutter the illustration.

One of the bracket assemblies $114_{1-n}$ attached to torque tube flange 102 and one of the bracket assemblies $118_{1-n}$ attached to the axial flange 106 are each connected to opposite sides of one of the thermally-insulating tangential load bearing member $112_{1-n}$. Typically, the thermally-insulating tangential load bearing members $112_{1-n}$ are threaded on each end. These threaded ends pass through passages in the bracket assemblies $114_{1-n}$ and $118_{1-n}$ and are secured by a nut $120_{1-n}$. This rigidly attaches each thermally-insulating tangential load bearing member $112_{1-n}$ to a bracket assembly $114_{1-n}$ attached to the torque tube flange 102 and a bracket assembly $118_{1-n}$ attached to the axial flange 106.

During operation of superconducting rotating machine 10, a torque load is generated which is transferred to load 21. If, for example, torque tube 22 rotates in the direction of arrow "X", load 21 (via axial shaft 24) will provide an opposing force in the direction of arrow "Y". Accordingly bracket assembly $114_{1-n}$ will be forced toward bracket assembly $118_{1-n}$, thus compressing the thermally-insulating tangential load bearing member $112_{1-n}$. Since each thermally-insulating tangential load bearing member $112_{1-n}$ is only exposed to a compression load, the strength of the composite material (e.g., G-10 phenolic, woven-glass epoxy, etc.) from which the members $112_{1-n}$ are constructed is sufficiently strong enough to transfers the torque load, as these members are not subjected to shear loading.

Please note that while the above example shows the thermally-insulating tangential load bearing member $112_{1-n}$ being configured so that they are subjected to a compression load, this is for illustrative purposes only and is not intended to be a limitation of the invention. Specifically, while not the optimal configuration, the thermally-insulating tangential load bearing members $112_{1-n}$ can be configured so that they are exposed to a tension load.

Figure 3:
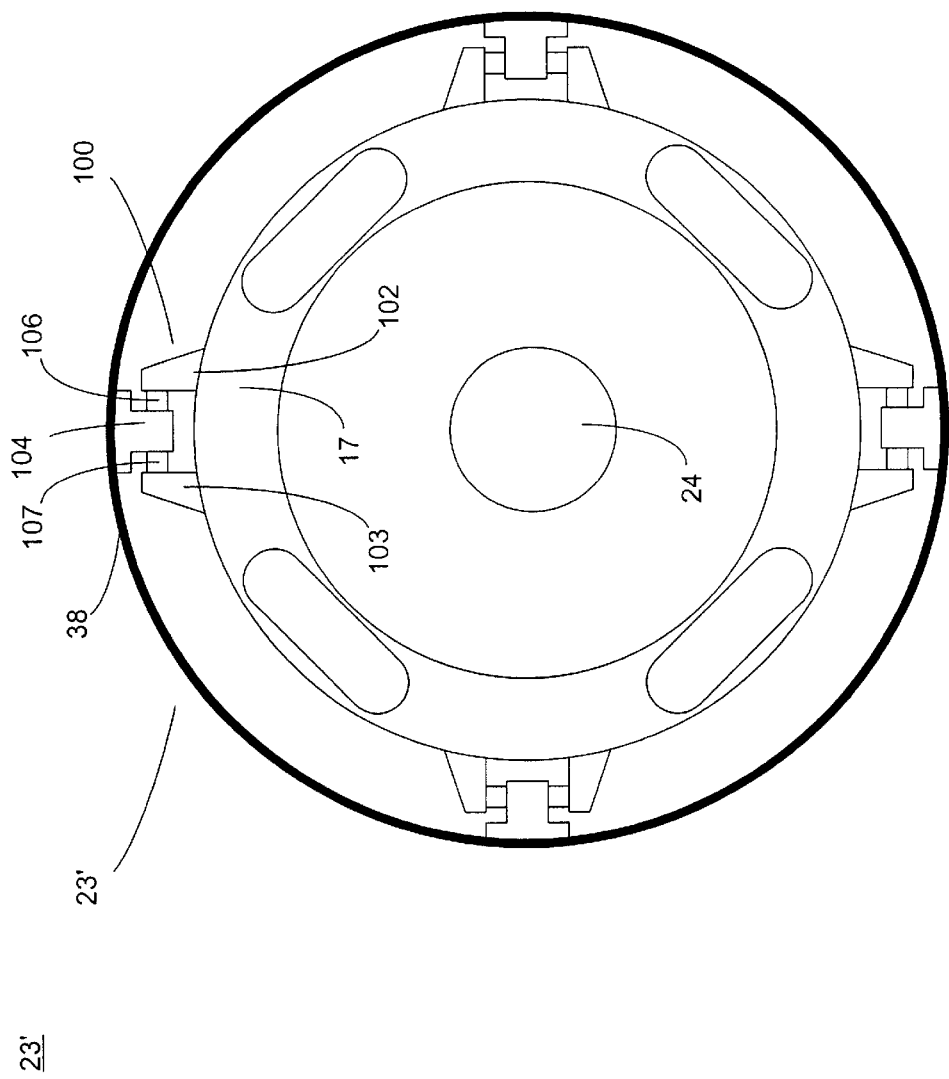
FIG. 3 is a cross-sectional end view of a rotor assembly incorporating an alternative embodiment of the thermally-insulating interconnection assembly.

Referring to FIG. 3, the details of an alternative embodiment 23' of the thermally-insulating interconnection assembly are shown (taken across section line A—A of FIG. 1). Now referring to FIGS. 1 and 3, this embodiment connects asynchronous field filtering shield 38 to winding support structure 17. Thermally-insulating interconnection assembly 23' includes several discrete torque transfer assemblies 100 positioned radially about output shaft 24. The specific number of discrete torque transfer assemblies 100 utilized will vary depending on the torque capacity of each discrete torque assembly 100 and the total motor torque delivered by superconducting rotating machine 10. Each discrete torque transfer assembly 100 includes two support structure bracket assemblies 102, 103, each of which is rigidly attached to winding support structure 17. This rigid attachment can be in the form of a weld or a mechanical fastener (e.g., a bolt). A shield bracket assembly 104, which is rigidly attached to the asynchronous field filtering shield 38, is positioned between the support structure bracket assemblies 102, 103. Again, this rigid attachment can be in the form of a weld or a mechanical fastener (e.g., a bolt). A thermally-insulating tangential load bearing member 106, 107 is positioned between each support structure bracket assembly 102, 103 and shield bracket assembly 104. This provides a point of connection and a torque path between each bracket assembly 102, 103, 104. As above, thermally-insulating tangential load bearing members 106, 107 are constructed of a high-strength low thermal conductivity composite material, such as a G-10 phenolic material. Additionally, bracket assemblies 102, 103, 104 are constructed of a high-strength, low thermal conductivity metallic material, such as Inconel™.

In this particular embodiment, there are two support structure bracket assemblies 102, 103 and one shield bracket assembly 104. Between the first support structure bracket assembly 102 and the shield bracket assembly 104, a first thermally-insulating tangential load bearing member 106 is utilized. Further, between the second support structure bracket assembly 103 and shield bracket assembly 104, a second thermally-insulating tangential load bearing member 107 is utilized. In this particular configuration, if winding support structure 17 rotates clockwise, the first thermally-insulating tangential load bearing member 106 will be subjected to a compression load and the second thermally-insulating tangential load bearing member 107 will be subjected to a tension load.

Please realize the above-described configuration is for illustrative purposes only and is not intended to be a limitation of the invention. Accordingly, the specific number of support structure bracket assemblies and shield bracket assemblies employed can be varied in response to various design criteria.

Figure 4:
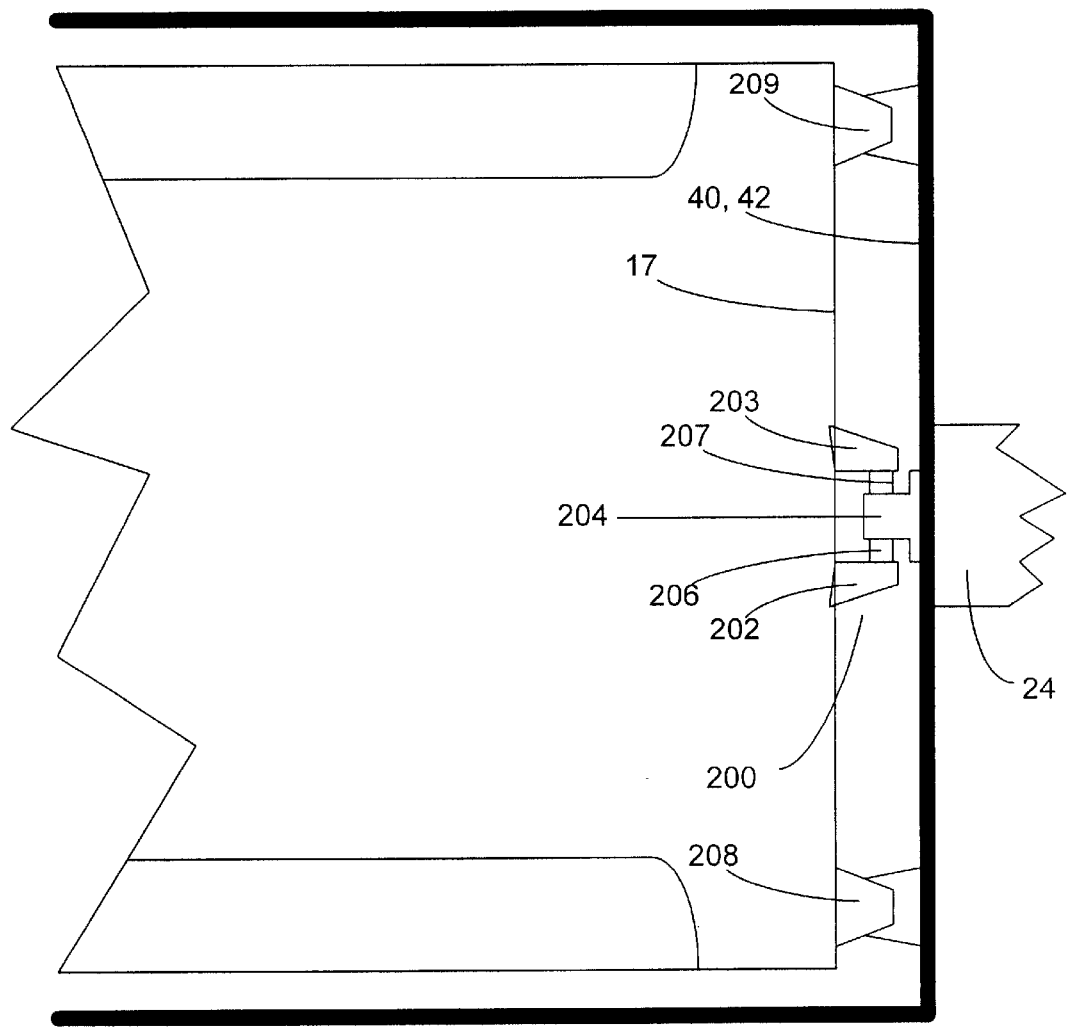
FIG. 4 is a cross-sectional bottom view of a rotor assembly incorporating an alternative embodiment of the thermally-insulating interconnection assembly.

Referring to FIGS. 1 and 4, the details of an alternative embodiment 23" of the thermally-insulating interconnection assembly are shown (taken across section line B—B of FIG. 1). Specifically, this embodiment connects end plate 40, 42 to winding support structure 17. Thermally-insulating interconnection assembly 23" includes several discrete torque transfer assemblies 200. The specific number of discrete torque transfer assemblies 200 utilized will vary depending on the torque capacity of each discrete torque assembly 200 and the total motor torque delivered by superconducting rotating machine 10. Each discrete torque transfer assembly 200 includes two support structure bracket assemblies 202, 203, each of which is rigidly attached to winding support structure 17. This rigid attachment can be in the form of a weld or a mechanical fastener (e.g., a bolt). An end plate bracket assembly 204, which is rigidly attached to one or both end plates 40, 42 is positioned between the support structure bracket assemblies 202, 203. Again, this rigid attachment can be in the form of a weld or a mechanical fastener (e.g., a bolt). A thermally-insulating tangential load bearing member 206, 207 is positioned between each support structure bracket assembly 202, 203 and end plate bracket assembly 204. This provides a point of connection and a torque path between each bracket assembly 202, 203, 204. As above, thermally-insulating tangential load bearing members 206, 207 are constructed of a high-strength low thermal conductivity composite material, such as a G-10 phenolic material. Additionally, bracket assemblies 202, 203, 204 are constructed of a high-strength, low thermal conductivity metallic material, such as Inconel™.

In this particular embodiment, there are two support structure bracket assemblies 202, 203 and one end plate bracket assembly 204. Between the first support structure bracket assembly 202 and the end plate bracket assembly 204, a first thermally-insulating tangential load bearing member 206 is utilized. Further, between the second support structure bracket assembly 203 and end plate bracket assembly 204, a second thermally-insulating tangential load bearing member 207 is utilized. In this particular configuration, if winding support structure 17 rotates clockwise (downward), the first thermally-insulating tangential load bearing member 206 will be subjected to a compression load and the second thermally-insulating tangential load bearing member 207 will be subjected to a tension load. Since the above-described discrete torque transfer assemblies 200 are positioned radially on end plates 40, 42, assemblies 208 and 209 represent side views of such a discrete torque transfer assembly 200.

Please realize the above-described configuration is for illustrative purposes only and is not intended to be a limitation of the invention. Accordingly, the specific number of support structure bracket assemblies and end plate bracket assemblies employed can be varied in response to various design criteria.

A number of embodiments of the invention have been described. Nevertheless, it will be understood that various modifications may be made without departing from the spirit and scope of the invention. Accordingly, other embodiments are within the scope of the following claims.

What is claimed is:

1. A superconducting rotor assembly comprising:
    an axial shaft;
    a winding support structure;
    an asynchronous field filtering shield which surrounds said winding support structure, said asynchronous field filtering shield being connected to said axial shaft via one or more end plates positioned on distal ends of said shield; and
    an interconnection assembly for mechanically coupling said winding support structure to said asynchronous field filtering shield, said interconnection assembly being configured to convert a torsional torque load experienced by said winding support structure to a tangential torque load which is provided to said asynchronous field filtering shield.

2. The superconducting rotor assembly of claim 1 wherein said interconnection assembly is configured to receive a tangential torque load which is a compression load.

3. The superconducting rotor assembly of claim 1 wherein said interconnection assembly is configured to receive a tangential torque load which is a tension load.

4. The superconducting rotor assembly of claim 1 wherein said thermally-insulating interconnection assembly includes one or more discrete torque transfer assemblies.

5. The superconducting rotor assembly of claim 4 wherein each said discrete torque transfer assembly includes:
    at least one support structure bracket assembly rigidly attached to said winding support structure;
    at least one shield bracket assembly rigidly attached to said asynchronous field filtering shield and positioned proximate said at least one support structure bracket assembly; and
    at least one thermally-insulating tangential load-bearing member, positioned between said at least one support structure bracket assembly and said at least one shield bracket assembly, for connecting said at least one support structure bracket assembly to said at least one shield bracket assembly.

6. The superconducting rotor assembly of claim 5 wherein said at least on thermally-insulating tangential load bearing member is constructed of a high-strength low thermal conductivity composite material.

7. The superconducting rotor assembly of claim 6 wherein said high-strength low thermal conductivity composite material is a G-10 phenolic material.

8. The superconducting rotor assembly of claim 5 wherein said at least one shield bracket assembly and said at least one support structure bracket assembly are constructed of a high-strength, low thermal conductivity metallic material.

9. The superconducting rotor assembly of claim 8 wherein said high-strength, low thermal conductivity metallic material is Inconel.

10. The superconducting rotor assembly of claim 1 wherein a superconducting winding assembly is mounted to said winding support structure, wherein said superconducting winding assembly is constructed using a high-temperature superconducting material.

11. The superconducting rotor assembly of claim 1 further comprising a refrigeration system for cooling said superconducting winding assembly.

12. An interconnection assembly for converting a torsional torque load experienced by a winding support structure to a tangential torque load which is provided to an asynchronous field filtering shield comprising:
  one or more discrete torque transfer assemblies, each said discrete torque transfer assembly including:
    at least one support structure bracket assembly rigidly attached to said winding support structure;
    at least one bracket assembly rigidly attached to said asynchronous field filtering shield and positioned proximate said at least one support structure bracket assembly; and
    at least one thermally-insulating tangential load-bearing member, positioned between said at least one support structure bracket assembly and said at least one shield bracket assembly, for mechanically coupling said at least one support structure bracket assembly to said at least one shield bracket assembly.

13. The thermally-insulating interconnection assembly of claim 12 wherein said interconnection assembly is configured to receive a tangential torque load which is a compression load.

14. The thermally-insulating interconnection assembly of claim 12 wherein said interconnection assembly is configured to receive a tangential torque load which is a tension load.

15. The thermally-insulating interconnection assembly of claim 12 wherein said at least one thermally-insulating tangential load bearing member is constructed of a high-strength low thermal conductivity composite material.

16. The thermally-insulating interconnection assembly of claim 15 wherein said high-strength low thermal conductivity composite material is G-10 phenolic material.

17. The thermally-insulating interconnection assembly of claim 12 wherein said at least one shield bracket assembly and said at least one support structure bracket assembly are constructed of a high-strength, low thermal conductivity metallic material.

18. The thermally-insulating interconnection assembly of claim 17 wherein said high-strength, low thermal conductivity metallic material is Inconel.

* * * * *